Dec. 21, 1943.   E. S. HEBELER   2,337,389

WELDER'S MASK OR HELMET

Filed July 16, 1941

INVENTOR.
Edward S. Hebeler
BY John B. Hull.
ATTORNEY.

Patented Dec. 21, 1943

2,337,389

UNITED STATES PATENT OFFICE 2,337,389

WELDER'S MASK OR HELMET

Edward S. Hebeler, Williamsville, N. Y., assignor of one-half to Unit Rays, Inc., Cleveland, Ohio, a corporation of Ohio Application July 16, 1941, Serial No. 402,591

3 Claims. (Cl. 2—8)

This invention relates to the art of welding and more particularly to what are known in that art as welders' masks or helmets and which are used by those performing metal welding and cutting operations for the purpose of shielding their eyes from the impact of the brilliant rays emitted during the operations of electric and torch welding, as well as during the operations of torch cutting.

Some of the masks or helmets, such as are usually employed by those engaged in such welding and cutting operations, have been provided with a protective shield of transparent material, such as glass or fire-resistant transparent plastic material, which will enable the operator to position his welding rod or his torch with reference to the work and also protect his face and eyes against impact by the hot scale which has been produced by the cutting or welding operation and which it is desirable to remove promptly after such operation.

Prior masks or helmets with which I am familiar have been provided, in addition to this transparent shield, with a shield of partly opaque colored material capable of protecting the eyes of the operator against the brilliance of the light produced by the welding or cutting operation and have also been provided with means whereby this additional glare-proof shield may be moved into and out of register with the protective shield. However, in all of the masks so equipped with which I am familiar, the means for interposing the glare-proof shield between the eyes of the operator and the work involve the use of mechanism which is liable to cause displacement of the welding rod or torch with reference to the work.

Figure 1:
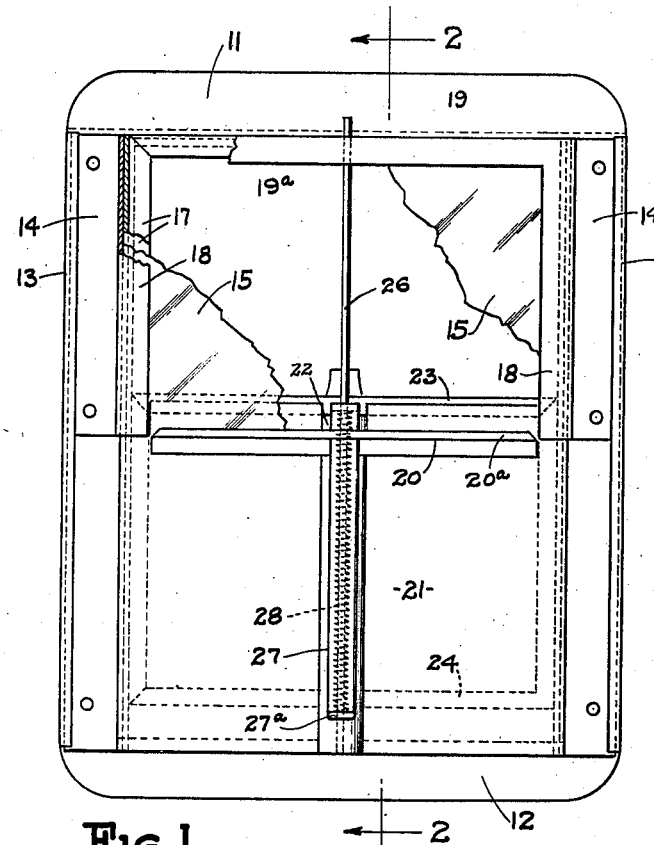
Figure 2:
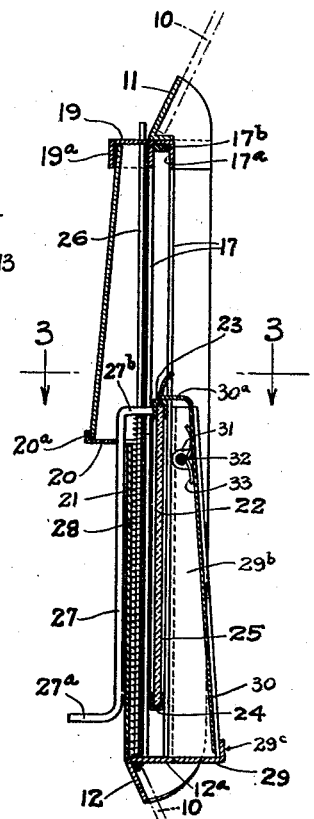
Figure 3:
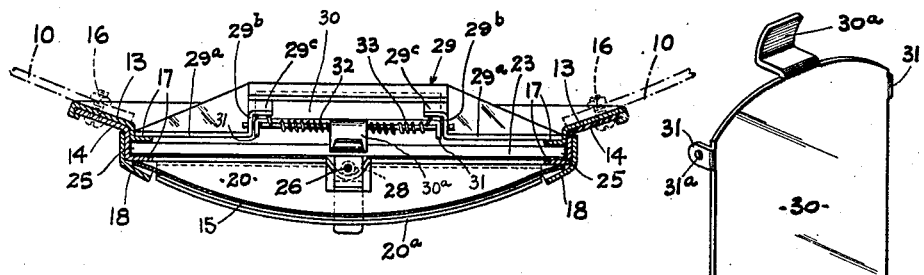
Figure 4:

The general purpose and object of my invention is to provide, for a mask or helmet such as described, means whereby the glare-proof shield may be so interposed between the eyes of the operator and the work without liability to disturb the position of the welding rod or torch with reference to the work. The present preferred means whereby I accomplish this object will now be described in connection with the drawing forming part hereof, wherein Fig. 1 represents a front elevation of a frame, adapted to be mounted in the front of a standard type of welders' mask or helmet, and having my invention incorporated therein; Fig. 2 a sectional view taken on the line 2—2 of Fig. 1, portions of the mask or helmet to which the frame is attached being shown by dot and dash lines; Fig. 3 a sectional view corresponding to the line 3—3 of Fig. 2; and Fig. 4 a detail in perspective of the latch element and its operating latch plate by means of which the glare-proof shield is held out of the field of vision of the operator while he is not engaged in the welding or cutting operation.

Describing the parts by reference characters, 10 denotes generally parts of the front of a mask or helmet; and extending across a front vision opening therein and attached thereto is a frame comprising an upper member 11, a bottom member 12, 12a and side members 13.

14 denotes the side members of a frame, the said members being shown as engaging the side members 13; and the side members of both frames, as well as the top and bottom members 11 and 12 of the former frame, are held against adjacent portions of the mask or helmet 10, as by means of short bolts 16.

The inner ends of the side members 13 and 14 are shaped to provide channeled guides 17 therebetween for the sides of the glare-proof shield, to be described hereinafter. These channeled guides merge with an upwardly transverse channeled seat 17a having a bead 17b therein of cushioning material, such as soft rubber. 18 denotes additional side members sceured in any convenient manner (as by welding), to the outer sides of the channeled guides 17 and providing, with the outer sides of these guides, seats for the side edges of the transparent shield 15. The upper edge of this transparent shield is received within an outwardly convex flange 19a projecting downwardly from a horizontal flange 19 to which the channeled guide 17 is shown as secured, as by welding.

The bottom of the transparent shield is mounted within an outwardly concave vertical flange 20a projecting from a horizontal base flange 20 which may be conveniently carried by and at the top of a cover plate 21 behind which the glareproof shield is retained when not in use. The side members 14 are preferably formed as upward extensions of the cover plate 21, which is secured to the sides 13 and 14 and, with them, to the adjacent portions of the body of the mask or helmet by the bolts 16.

It will be noted that both the top member 11 and the bottom member 12, 12a, are outwardly curved and that the portion 12 of the said bottom member slopes inwardly or rearwardly with respect to the body of the mask or helmet for the purpose of conforming to the contour of the latter.

22 denotes the eye-protecting pane of a glareproof shield, which pane may be made of glass or fire-resistant plastic material, the said pane being mounted in any suitable frame, the latter including channeled top and bottom members 23, 24 and channeled side members 25 which are slidably mounted within the guides 17.

26 denotes a vertical guide rod located centrally between the sides of the frame thus far described and having its opposite ends mounted in the flanges 19 and 12ª. 27 denotes an operating member for pulling the glare-proof shield downwardly behind the cover 21. This operating member comprises a vertical portion having a finger engaging portion 27ª at its lower end and having its upper end extending horizontally inwardly, as shown at 27ᵇ and connected with the upper channeled member 23 of the framework for the glare-proof shield. The operating member 27 is located centrally between the sides of the frame and has an aperture through the horizontal portion 27ᵇ thereof through which the guide rod 26 extends. A coiled spring 28 surrounds the guide rod with its lower end bearing against the flange 12ª and its upper end against the inwardly extending portion 27ᵇ of the operating member 27 and, when unrestrained, operates to raise the glare-proof shield 22 into the position where it will be interposed between the eye of the operator and the shield 15, with its upper edge in engagement with the pad 17ᵇ.

For the purpose of retaining the glare-proof shield in the operative position shown in Figs. 1, 2 and 3 and for permitting it to be raised, when desired, by the spring 28, I have provided the following means: 29 denotes a base flange extending partly across the back of the main frame and having sides 29ª extending therefrom and secured in any suitable manner to the side members 13. Each of the sides 29ª is provided at its inner edge with an angular flange comprising a rearwardly projecting flange 29ᵇ from the front edge of each of which there projects an inwardly and vertically extending flange 29ᶜ. 30 denotes what I have designated a latch plate, having a main body provided with forwardly projecting lugs 31 near the top thereof, each lug having an opening 31ª for the reception of a pivot rod 32, which extends through the openings of said lugs and is mounted in the opposed side flanges 29ᵇ. Surrounding the said rod is a coiled torsion spring 33 having one end thereof anchored to one of the flanges 29ᶜ and its opposite end pressing against the body of the latch plate, below the said rod.

The latch plate is provided at its upper end with a latch proper, 30ª, which is adapted to overhang the upper end of the frame of the glare-proof shield and to normally retain the said shield in the depressed position shown in Figs. 2 and 3.

The parts are so proportioned that, when the mask or helmet is in its operative position on the head of the wearer, either or both shields will be interposed between the eyes of the operator and the work, with the mouth of the operator located adjacent to the lower portion of the latch plate 30, the said latch plate being so proportioned as to provide an extensive area for the interception of the breath emitted through the lips of the operator.

Assuming that the parts are in the positions shown in Fig. 1 and that the operator has positioned his welding electrode or torch in the desired position with reference to the work, the resistance of the spring 33 is so light that the operator, by emitting a sharp puff or breath from his lips, will cause the latch plate to be rocked to a position whereby the latch 30ª will be released from engagement with the top of the glare-proof shield and the latter will be elevated to its operative position. This interception of the glare-proof shield between the eyes of the operator and the work can be accomplished without the necessity for using either of his hands or for so moving his head or his hands as to affect the starting position in which the welding electrode or torch may have been placed by him.

At the end of the welding or cutting operation, the operator merely pulls downwardly upon the finger piece 27ª until the top of the glare-proof shield has been brought below the latch 30ª, whereupon the latter will be moved into locking engagement with the top of said shield by means of the spring 33.

The means shown and described herein for automatically interposing the glare-proof shield between the eyes of the operator and the work is simple in construction, economical of production, and is particularly efficient in enabling the same to be used without the employment of either of the hands of the operator and without disturbing the position of the welding electrode or torch with reference to the work.

Having thus described my invention, what I claim is:

1. In a welder's mask or helmet having a vision opening in the front thereof, guides located adjacent to each side of said opening and extending below the same, a glare-proof shield reciprocably mounted in said guides and comprising an eye-protecting pane adapted to be moved therealong upwardly into registration with said opening and downwardly out of registration with said opening, spring means tending and adapted to move said shield upwardly thereby to bring said pane into registration with said opening, and releasable means for retaining said shield below and out of registration with said opening, said releasable means comprising a latch element arranged to be moved into and out of engagement with a portion of the shield when the latter is in its lowered position, and a pivotally supported operating member connected with said element and extending downwardly rearwardly of said shield, when the latter is in its lowered position, and in front of and in proximity to the mouth of the operator using the said mask or helmet, and yieldable means engaging the said operating member, thereby to normally hold the latch element in engagement with the said portion of the said shield when the latter is in such lowered position.

2. In a welder's mask or helmet having a vision opening in the front thereof, guides located adjacent to each side of said opening and extending below the same, a glare-proof shield reciprocably mounted in said guides and comprising an eye-protecting pane adapted to be moved therealong upwardly into registration with said opening and downwardly out of registration with said opening, spring means tending and adapted to move said shield upwardly thereby to bring said pane into registration with said opening, and releasable means for retaining said shield below and out of registration with said opening, said releasable means comprising a pivotally supported latch plate extending downwardly rearwardly of said shield when the latter is in its lowered position and having a portion of extensive area located in front of and in proximity to the mouth of the operator using the said mask or helmet, a latch on the upper end of said latch plate adapted to engage the upper edge of the shield when the latter is in its lowered position, and spring means engaging the latch plate and holding the latch in a position to engage the upper edge of the said shield when the latter is in such lowered position.

3. In a welder's mask or helmet having a vision opening in the front thereof, guides located adjacent to each side of said opening and extending below the same, a glare-proof shield reciprocably mounted in said guides and comprising an eye-protecting pane adapted to be moved therealong upwardly into registration with said opening and downwardly out of registration with said opening, spring means connected to said shield for moving the same upwardly thereby to bring said pane into registration with said opening, and releasable means for retaining said shield below and out of registration with said opening against the action of said spring, said releasable means comprising a latch element, means pivotally supporting the said latch element in position to engage a portion of the said shield when the latter is in its lowered position, an operating member connected to said latch element and located rearwardly of said shield when the latter is in its lowered position, and a spring engaging the said operating member thereby to press the latch element into engagement with the said portion of the said shield.

EDWARD S. HEBELER.